INTEREFERENCE REDUCING CIRCUIT

Filed Dec. 28, 1949 2 Sheets-Sheet 1

Inventor
Arthur Miller
by Roberts, Cushman & Grover
Att'ys.

Feb. 6, 1951 A. MILLER 2,540,954

INTEREFERENCE REDUCING CIRCUIT

Filed Dec. 28, 1949 2 Sheets-Sheet 2

Inventor
Arthur Miller
by Roberts, Cushman & Grover
Att'ys

Patented Feb. 6, 1951 2,540,954

UNITED STATES PATENT OFFICE 2,540,954

INTERFERENCE REDUCING CIRCUIT

Arthur Miller, Watertown, Mass., assignor to Sanborn Company, Cambridge, Mass., a corporation of Massachusetts Application December 28, 1949, Serial No. 135,355

4 Claims. (Cl. 171—97)

In many types of portable electrical equipment it is necessary in order to reduce electrical interference to connect the frame or chassis to ground. As is described in my United States Letters Patent No. 2,500,994 of which the present application is a continuation in part, if the chassis comprising the return electrical path for the amplifying and recording circuits of an electrocardiograph is not carefully connected by a low impedance path to a water pipe or other conductor at ground potential, a high alternating potential may be developed between the chassis and ground. The patient's body is connected to the input of the amplifier and acts as an antenna picking up stray alternating voltages some portion of which may appear after amplification in the final electrocardiograph record so that the interpretation thereof is difficult or impossible. If the chassis is at a high potential as a result of the omission of the ground connection when the patient is connected to the chassis by the amplifier input circuit, the instrument chassis itself may constitute the greatest source of interference voltage.

Energy to operate such amplifiers is usually obtained from a commercial alternating power source one conductor of which is at ground potential. The presence of stray capacitance coupling between the primary and secondary transformer windings of the direct power supply to the amplifier results in a potential between the ungrounded chassis and ground which may approach the sum of the potentials developed across the primary and one of the secondary windings respectively. As one of the input electrodes is linked with the chassis of the amplifier, these capacitance introduced potentials result in a voltage drop from the patient's body to ground which is much greater in magnitude than the voltage drop due to the antenna effect of the patient's body alone so that the interference voltage appearing in the record is correspondingly greater.

Such difficulties as those pointed above are aggravated in portable instruments which are used in rooms of a hospital or clinic wherein it is often inconvenient or impossible to find an object at ground potential to which to connect the grounding conductor.

Objects of this invention are to provide a circuit which substantially eliminates the interference resulting when the chassis of an amplifier or other electrical equipment is above ground potential, which eliminates the danger of shock resulting from bodily contact with such chassis, which does not interfere with the normal operation of the equipment, which is automatic in operation, which warns the operator when the chassis is not grounded, and which is simple and economical to construct and install.

In a broad aspect the invention contemplates an interference reducing circuit for an amplifier comprising a transformer, which may be the transformer of the direct power supply to the amplifier, having a secondary or tertiary winding connected to the amplifier chassis and a primary winding each end of which is linked to a respective terminal for connecting the primary winding to a grounded alternating power source. The chassis is coupled by means of an impedance, having either reactive or ohmic characteristics, to one of the terminals. The characteristics of the impedance are low enough with respect to the stray capacitances of the transformer so that with respect to the voltage introduced by such capacitances the chassis is substantially at ground potential, while being great enough to introduce a voltage drop which will prevent a lethal shock upon bodily contact with the chassis if the primary terminal coupled thereto is accidentally connected to the ungrounded side of the alternating power source.

Another aspect of the invention concerns the introduction of an electrical network between the primary winding terminal coupled to the chassis and at least one of the ends of the secondary or tertiary winding for supplying a counter electromotive force substantially equal in magnitude and opposite in phase to the voltage drop resulting from the stray capacitance coupling between the various windings of the transformer thereby effectively maintaining the chassis at substantially ground potential.

In one specific aspect the counter electromotive force is obtained from the entire or a portion of the secondary winding of the transformer by coupling one end thereof to the primary winding terminal linked to the chassis by means of an impedance such as a capacitor, the characteristics of which impedance are such that the voltage impressed upon the impedance coupling the primary terminal to the chassis, is substantially equal in magnitude and opposite in phase to the voltage resulting from the stray capacitance coupling between the primary and secondary (or tertiary) windings so that the chassis is maintained substantially to ground potential.

In another specific aspect the counter electromotive force is tapped off a voltage dividing network including two potentiometers which are connected between the ends of the transformer secondary winding. The adjustable tap of one of the potentiometers is connected by means of an impedance, for example a capacitor, to the primary terminal coupled to the chassis. The other potentiometer tap is connected to the same terminal by a resistor so that there is a phase difference of approximately 90 degrees between the voltages tapped from the respective potentiometers. By proper adjustment the sum of the voltages derived from the respective potentiometers is made equal in magnitude and opposite in phase to the voltage developed across the impedance coupling the primary terminal to the chassis as a result of the stray capacitance coupling of the transformer primary and secondary windings.

Another feature of the invention is the electrostatic shielding of the primary and secondary windings of the transformer so that the capacitance coupling and, therefore, the potential drop through the terminal coupling impedance which must be balanced by the counter electromotive force are reduced to a minimum.

A further feature is the use of a neon glow tube which is connected in series with a resistor between the chassis and a body contact member which is located in such a position as to come in contact with the body or hands of the operator during normal operating procedure. If the ungrounded side of the power source is accidentally connected to the primary terminal which is coupled to the chassis, an electrical path is completed by the capacitance of the operator's body to illuminate the glow tube thereby warning the operator of the high potential impedance impressed upon the amplifier chassis.

These and other objects, aspects and features of the invention will be apparent from and illustrated by the specific embodiment thereof now to be described with reference to drawings in which.

Figure 1:
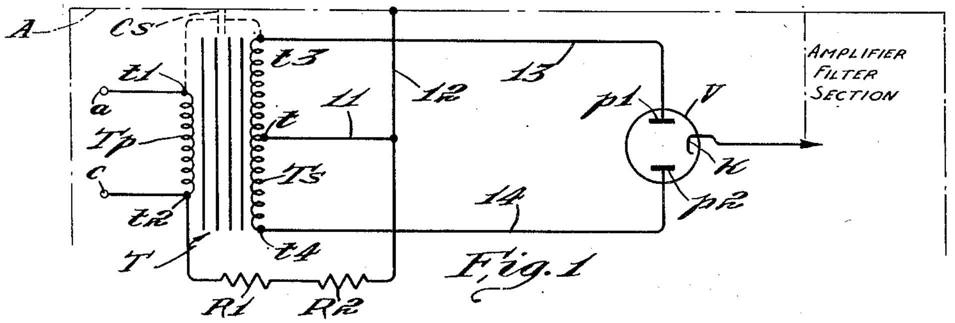
Fig. 1 is a circuit diagram of one embodiment of the invention incorporating an impedance by means of which the amplifier chassis is connected to one of the transformer primary terminals.

The interference reducing circuit shown in Fig. 1 comprises a transformer T which is connected in the power supply section of an electrocardiograph in the conventional manner with the ends *t1* and *t2* of the primary winding T*p* linked with the terminals *a* and *c* which are adapted for connecting the primary winding with a single phase alternating power source of the conventional type having one grounded side. The mid-tap *t* of the secondary winding T*s* is linked to the amplifier chassis A by the leads 11 and 12. The ends *t3* and *t4* of the secondary winding Ts are connected by the wires 13 and 14 with the anodes *p1* and *p2* respectively of a double diode vacuum tube rectifier V. The cathode *k* of the tube V is coupled to the input of the amplifier filter section in the conventional manner.

Because of the physical proximity of the high voltage secondary winding to the primary winding, stray capacitance coupling exists between the two. Furthermore, the coupling effect will, in general, be much greater between the primary and one end of the secondary than that which exists between the primary and the opposite end of the secondary. This asymmetry is shown diagrammatically by the single coupling capacitance C*s* shown in broken lines interconnecting the winding end terminals *t1* and *t3*.

If the circuit described above is used with the amplifier chassis A insulated from ground, the stray capacitance C*s* impresses upon the chassis A a potential to ground which is approximately equal in magnitude to the sum of the primary voltage and the voltage developed between the mid-tap *t* and the end *t3* of the secondary winding.

To eliminate the inconvenience of a separate ground lead the mid-tap *t* and, therefore, the amplifier chassis A are connected to the primary winding end terminal *t2* and therefore to the input terminal *c* by an impedance such as the series resistors R1 and R2. The value of each of the resistors is made approximately 0.1 megohm so that 200,000 ohms are in series between the chassis A and the terminal *c*. Such an impedance is low relative to the impedance of the stray capacitance coupling C*s* thereby effectively grounding the chassis if terminal *c* is the grounded side of the power supply. Under these conditions the chassis cannot inject a large interference voltage into the patient circuit. If by accident the input terminal *c* is connected to the ungrounded side of the source, the 100,000 ohms impedance of either resistor introduces sufficient voltage drop to prevent a dangerous shock in case of simultaneous bodily contact with the chassis A and a grounded object. Two resistors are connected in series as a safety measure so that in the event of a breakdown of one resistor, the other resistor isolates the chassis from the power source.

Figures 2, 3:
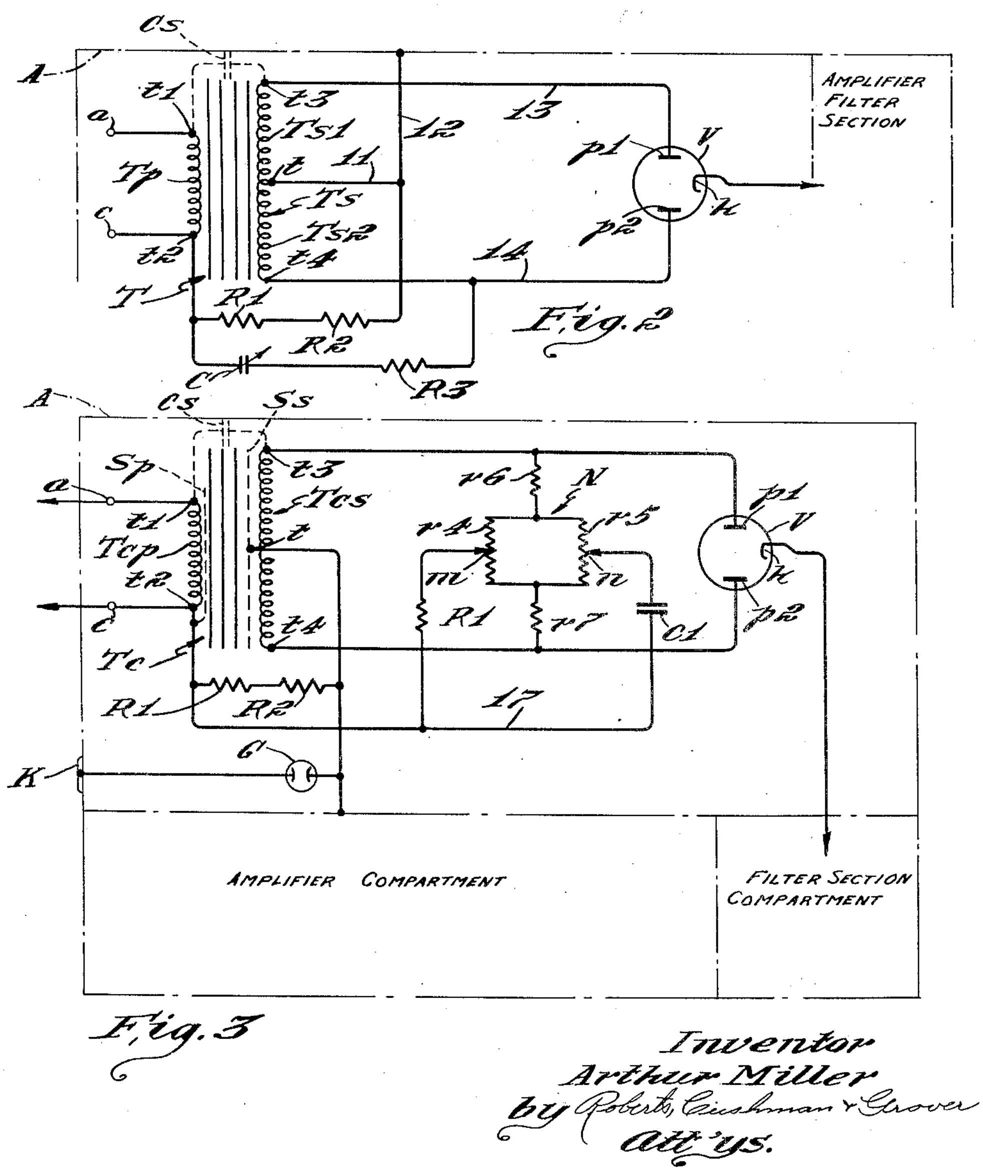
Fig. 2 is a circuit diagram of another embodiment of the invention incorporating one means of obtaining a counter electromotive force.
Fig. 3 is a circuit diagram of a third embodiment of the invention incorporating other means of obtaining a counter electromotive force.

Although the impedance of the series resistors R1 and R2 is low as compared with the impedance of the stray capacitance coupling C*s*, there is always a small potential drop across the resistors which raises the potential of the chassis A slightly above ground potential thereby introducing some interference in the record. In Fig. 2 is shown a circuit which further reduces the potential difference between the chassis A and ground. This circuit is essentially similar to the circuit shown in Fig. 1 and described in detail above, the transformer T, the tube V and the resistors R1 and R2 being interconnected in an analogous manner; but also includes a network for impressing a counter electromotive force across the resistors R1 and R2 which is substantially equal in magnitude and opposite in phase to the voltage drop across the resistors resulting from the capacitance coupling C*s*.

The last mentioned network comprises an impedance such as the resistor R3 and a capacitor C connected in series between the primary winding end terminal *t2* and the end *t4* of the transformer secondary winding T*s*. When the primary winding T*p* is energized, the portion T*s*2 of the secondary winding T*s* causes a current to flow through a series circuit including the resistors R1 and R2, the capacitor C and the resistor R3. The reactance of the capacitor C is made very much greater than the ohmic impedance of the resistor R3 so that the series combination thereof acts essentially as a simple capacitance circuit, the resistor R being used only as a safety device to prevent a low impedance connection between the chassis and power supply through T*s*2 if a breakdown or failure of the capacitor C occurs. With a transformer T of conventional design, a capacitor C with a reactance in the range of 0.0001 mfg. to 0.0006 mfg. has been found suitable. A resistor R3 having a resistance as great as 0.5 megohm may be used with such a capacitor without appreciably affecting the operation of the circuit at the usual power frequencies.

It will be apparent that although the currents flowing through the respective portions Ts1 and Ts2 vary concomitantly so that such currents have the same direction at any given time, the counter-electromotive force in the above circuit is opposite in direction to the voltage drop occurring as a result of current flowing through a circuit completed by the stray capacitance coupling Cs and also including the primary winding Tp, the portion Ts2 of the secondary winding Ts, the wires 11 and 16 and the resistors R1 and R2. By making the capacitor C variable, the impedance of the counter-electromotive force circuit is adjusted to make the voltage drop across the resistors R1 and R2 equal in magnitude to the voltage drop resulting from the capacitance coupling Cs so that the net drop across the resistors is substantially zero and the potential of the chassis A is substantially that of ground when the terminal *c* is connected to the grounded side of the power supply.

A more elaborate interference reducing circuit based upon a similar principle of operation is shown in Fig. 3. As described above with respect to the other embodiments the primary winding Tcp of a power supply transformer Tc for an electrocardiograph amplifier is adapted to be connected to a single phase alternating power source (not shown) by means of the terminals *a* and *c*. The ends *t3* and *t4* of the secondary winding Tcs are connected by the wires 13 and 14 to the anodes *p1* and *p2* of the vacuum tube rectifier V and the secondary mid-tap *t* is linked to the chassis A of the amplifier in a manner similar to that described heretofore.

The transformer Tc differs from the transformer T used in the previously described embodiments in that the primary winding Tcp and the secondary winding Tcs are each provided with an electrostatic shield such as the shields Sp and Ss respectively. The electrostatic shield Sp for the primary winding is coupled to the power terminal *c*. The secondary electrostatic shield Ss is coupled to the secondary mid-tap *t* thereby maintaining the stray capacitance coupling between the windings Tcp and Tcs at a minimum.

The secondary mid-tap *t* is also connected to the power terminal *c* by means of the resistors R1 and R2 which perform analogous functions to the resistors bearing the same indicia in previously described embodiments. Although the electrostatic shields Sp and Ss reduce the capacitance introduced voltage drop across the resistors R1 and R2 to a minimum, there is a residual voltage drop which is balanced by a counter-electromotive force derived from a voltage dividing network N connected between the ends *t3* and *t4* of the secondary winding Tcs.

The network N comprises two parallel connected potentiometers *r4* and *r5* which are also connected in series with the equal value resistors *r6* and *r7* between the secondary winding ends *t3* and *t4*. The potentiometers *r4* and *r5* are provided with the respective adjustable taps *m* and *n*. The tap *m* is coupled to the power terminal *c* by the resistor R31 and the lead 17. The tap *n* is also coupled to terminal *c* by means of the capacitor C1 and the lead 17.

With a symmetrical resistor network when the tap *n* is in its midposition, the voltage between *n* and the chassis A is zero. As the tap *n* is moved from its midposition, depending upon the direction of the movement a fraction of the voltage between *t* and *t3* or between *t* and *t4*, cause a current to flow through capacitor C1 and the resistors R1 and R2. It is evident that by proper adjustment this current can be made equal in magnitude and opposite in phase to the current through resistors R1 and R2 resulting from stray capacitance coupling between the transformer windings Tcp and Tcs so that the net voltage across R1 and R2 approaches zero in a manner analogous to that in which the secondary winding Ts and the capacitor C provide a counter-electromotive force as was described in connection with the operation of the circuit in Fig. 2.

It is evident that only an approximate voltage balance can be obtained by the circuit shown in Fig. 2 or by the tap *n* shown in Fig. 3 as no provision is made for compensating for any phase difference between the opposing voltages developed across the resistors R1 and R2. Such phase compensation is accomplished in the circuit shown in Fig. 3 by the adjustable tap *m* of the second potentiometer *r4* which, in conjunction with the resistor R31 causes a current component to flow through R1 and R2 which is approximately 90° out of phase with the current through C1. By proper adjustment of the taps *m* and *n* it is possible to obtain a summation voltage equal in magnitude and opposite in phase to the stray capacitance introduced voltage drop across resistors R1 and R2, thereby substantially to counteract this stray capacitance.

In the above description of the operation of the various embodiments of the interference reducing circuit, it has been assumed that the terminal *c* is connected to the grounded side of the power source. As most alternating power source outlets are not provided with an indication as to the grounded side it is evident that the probability that the *a* terminal will be connected to the grounded side of the power source is equally great. Although the patient and operator are protected from shock by the impedance of the resistors R1 and R2 when such a reverse connection to the power source is made, the interference introduced by the antenna effect of the patient's body disturbs the interpretation of the record so that it is desirable to warn the operator whenever this condition exists.

Such warning is provided in the circuit in Fig. 3 by a glow tube G. One electrode of the tube G is coupled to the chassis A, the other electrode being connected to a body contact member K which is located so that the body or hands of the operator come in contact therewith during the normal operating procedure. If the terminal *a* is at ground potential an electrical path is completed across the power source including the terminal *c*, resistors R1 and R2, the tube G, the contact K, the body capacitance of the operator to ground and the grounded terminal *a* so that the tube G is illuminated as a signal. When the terminal *c* is at ground potential the glow tube G is not connected across any source so that it is not illuminated.

The principles of operation described above can also be applied to a power transformer wherein the secondary winding is not provided with a mid-tap. As is shown in Fig. 4, the chassis A is again connected to the grounded input terminal *c* of the power supply by the resistors R1 and R2. The end terminal *t3* of the secondary winding T1s of the power transformer T1 is also connected to the chassis A. The opposite secondary end terminal $t4$ is connected to the filter section by means of a half wave rectifier element X which may be, for example a rectifier tube or a rectifying device incorporating any of the well known boundary layer elements. The secondary terminal $t4$ is connected to the end terminal $t2$ of the transformer primary winding T1p by means of a series circuit including the resistor R3 and the capacitor C.

Figure 4:
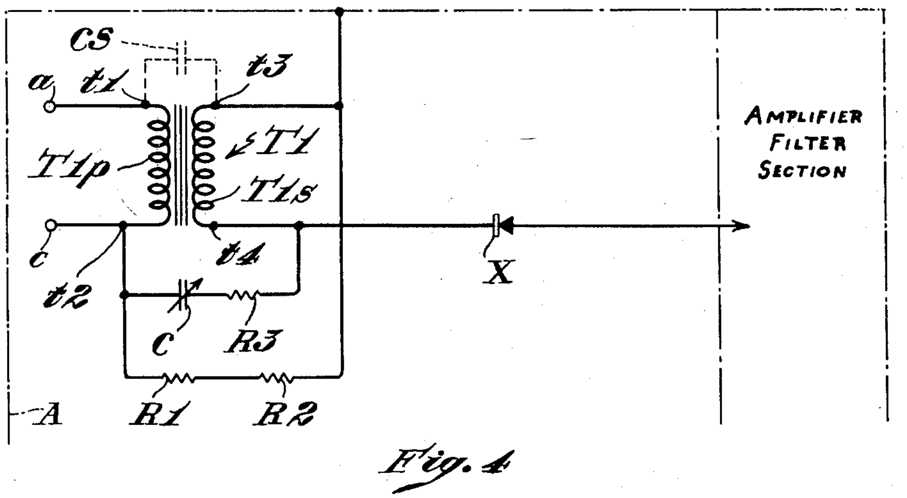
Fig. 4 is a circuit diagram of a fourth embodiment of the invention incorporating a half wave rectifier and a transformer having a secondary winding which does not have a mid-tap.

The function of the resistor R3 and the capacitor of the embodiment in Fig. 4 are analogous to that of the corresponding elements in the embodiment in Fig. 2. It will be noted in Fig. 4 that it is the entire secondary winding T1s, rather than a portion thereof as is the case in Fig. 2, which supplies the electromotive force, it therefore being necessary that the polarity of the transformer windings be chosen whereby the circulating current through the resistors R1 and R2 has such a phase relationship with respect to the current resulting from the stray capacitance coupling Cs that the currents oppose one another.

Figure 5:
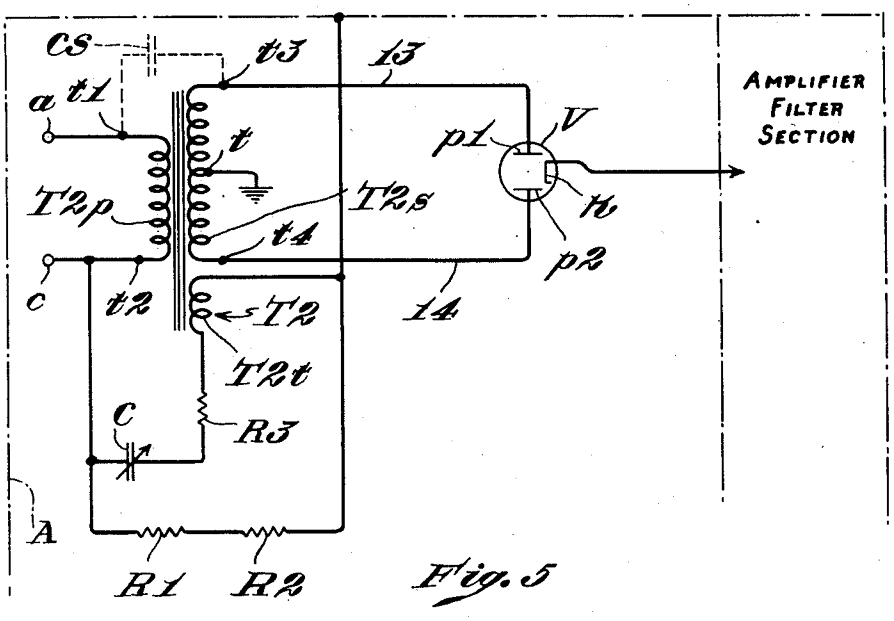
Fig. 5 is a circuit diagram of a fifth embodiment of the invention incorporating a transformer having a tertiary winding as a source of counter electromotive force.

In the embodiment shown in Fig. 5, the counter electromotive force is supplied from a tertiary winding T2t wound upon the core of the transformer T2. The tertiary winding T2t is connected in series with the resistors R1, R2 and R3 and the capacitor C. The common junction of the capacitor C and the resistor R1 is coupled to the terminal $t2$ of the transformer primary winding T2p. The common junction of the resistor R2 and the tertiary winding T2t is connected to the chassis A. The secondary winding T2s is connected to the full wave rectifier tube in the conventional manner, the mid-tap $t$ being grounded and the end terminals $t3$ and $t4$ being linked with the plates $p1$ and $p2$ of the full wave rectifier tube V by means of the conductors 13 and 14 respectively. In this embodiment the resistors R1 and R2 effectively ground the chassis A to the power source, the small remaining voltage drop being neutralized by the counter electromotive force developed thereacross by the tertiary winding T2t.

It should be understood that the present disclosure is for the purpose of illustration only and that this invention includes all modifications and equivalents which fall within the scope of the appended claims.

I claim:

1. An interference reducing circuit for an amplifier energized from a grounded alternating power source and having a chassis as a common electrical return path, said circuit comprising a transformer having a secondary winding with an end terminal connected to the chassis of said amplifier and a primary winding, a terminal linked to each of the respective ends of the primary winding for connecting said power source therewith, an impedance coupling said end terminal of said secondary winding with one of said primary winding terminals, and a second impedance connecting the opposite end terminal of said secondary winding with the same primary winding terminal, the characteristics of the second impedance being such and the secondary winding end terminal being selected so that a voltage is impressed across the first impedance which is substantially equal in magnitude and opposite in phase to the voltage resulting from the stray capacitance coupling between the primary and secondary windings of the transformer thereby effectively maintaining the chassis at substantially ground potential.

2. An interference reducing circuit for an amplifier energized from a grounded alternating power source and having a chassis as a common electrical return path, said circuit comprising a transformer having a secondary winding with an end terminal connected to the chassis of said amplifier and a primary winding, a terminal linked to each of the respective ends of the primary winding for connecting said power source therewith, a resistor coupling said end terminal of said secondary winding with one of said primary winding terminals, and a capacitor connecting the opposite end terminal of said secondary winding with the same primary winding terminal, the reactive characteristics of the capacitor being such and the secondary winding end terminal being selected so that a voltage is impressed across the resistor which is substantially equal in magnitude and opposite in phase to the voltage resulting from the stray capacitance coupling between the primary and secondary windings of the transformer thereby effectively maintaining the chassis at substantially ground potential.

3. An interference reducing circuit for an amplifier energized from a grounded alternating power source and having a chassis as a common electrical return path, said circuit comprising a transformer having a secondary winding connected to supply power to said amplifier, a tertiary winding, and a primary winding having input terminals for connecting said power source therewith, an impedance coupling the chasses with one of said primary input terminals, a second impedance connecting one end of the tertiary winding with the same primary input terminal, the opposite end of the tertiary winding being connected to the chassis, the characteristics of the second impedance being such, and the polarity of the tertiary winding being so chosen that the current component through the first impedance due to the tertiary voltage is equal in magnitude and opposite in phase to the current component in the first impedance due to the stray capacitance coupling between the windings of the transformer, thereby effectively maintaining the chassis at substantially ground potential.

4. An interference reducing circuit for an amplifier energized from a grounded alternating power source and having a chassis as a common electrical return path, said circuit comprising a transformer having a secondary winding connected to supply power to said amplifier, a tertiary winding, and a primary winding having input terminals for connecting said power source therewith, a resistor coupling the chassis with one of said primary input terminals, a capacitor connecting one end of the tertiary winding with the same primary input terminal, the opposite end of the tertiary winding being connected to the chassis, the reactive impedance of the capacitor being such, and the polarity of the tertiary winding being so chosen that the current component through the resistor due to the tertiary voltage is equal in magnitude and opposite in phase to the current component in the resistor due to the stray capacitance coupling between the windings of the transformer, thereby effectively maintaining the chassis at substantially ground potential.

ARTHUR MILLER.

No references cited.